US008163858B2

(12) United States Patent
Samuels et al.

(10) Patent No.: US 8,163,858 B2
(45) Date of Patent: Apr. 24, 2012

(54) COPOLYMERS FOR BARRIERS

(75) Inventors: George J Samuels, Williamsville, NY (US); Gregory J Shafer, Chaffee, NY (US); Tao Li, Parsippany, NJ (US); Clinton A Threlfall, Whorton, NJ (US); Nancy Iwamoto, Ramona, CA (US); Eric J Rainal, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 201 days.

(21) Appl. No.: 11/961,660

(22) Filed: Dec. 20, 2007

(65) Prior Publication Data

US 2008/0171844 A1   Jul. 17, 2008

Related U.S. Application Data

(60) Provisional application No. 60/871,006, filed on Dec. 20, 2006.

(51) Int. Cl.
*C08F 14/18* (2006.01)

(52) U.S. Cl. ........ 526/253; 526/249; 526/250; 526/255; 526/320; 526/327; 526/329.4; 526/332; 526/342; 526/348.2; 526/348.4; 526/348.6

(58) Field of Classification Search ................. 526/255, 526/249, 250, 253
See application file for complete search history.

(56) References Cited

U.S. PATENT DOCUMENTS

| | | | |
|---|---|---|---|
| 2,559,640 A | 7/1951 | Kruger | |
| 2,919,263 A | 12/1959 | Kahrs et al. | |
| 2,931,840 A | 4/1960 | Marquis | |
| 2,970,988 A * | 2/1961 | Lo | 526/249 |
| 2,996,555 A | 8/1961 | Rausch | |
| 3,053,818 A | 9/1962 | Honn et al. | |
| 3,085,996 A | 4/1963 | Lo | |
| 3,240,757 A | 3/1966 | Sterling | |
| 3,324,069 A | 6/1967 | Koblitz et al. | |
| 3,706,723 A | 12/1972 | Chandrasekaran | |
| 3,716,599 A | 2/1973 | Vasta | 260/859 |
| 3,723,387 A * | 3/1973 | Nyce | 525/326.3 |
| 3,812,066 A | 5/1974 | Stone et al. | |
| 3,893,987 A | 7/1975 | Chandrasekaran | 260/80.77 |
| 4,027,086 A * | 5/1977 | Lo Valvo et al. | 526/79 |
| 4,146,521 A | 3/1979 | Godfrey | 260/27 |
| 4,308,359 A | 12/1981 | Büning | 525/276 |
| 4,315,237 A | 2/1982 | Middleman et al. | |
| 4,659,625 A | 4/1987 | Decroly et al. | 428/412 |
| 4,667,000 A * | 5/1987 | Ohmor et al. | 526/247 |
| 4,677,017 A | 6/1987 | DeAntonis et al. | 428/214 |
| 4,943,473 A | 7/1990 | Sahatjian et al. | 428/245 |
| 4,990,406 A | 2/1991 | Kappler et al. | 428/422 |
| 5,051,345 A | 9/1991 | Haraga et al. | 430/505 |
| 5,060,394 A | 10/1991 | Lincoln et al. | 33/763 |
| 5,098,972 A | 3/1992 | Kappler et al. | |
| 5,139,878 A | 8/1992 | Kim et al. | 428/421 |
| 5,200,480 A | 4/1993 | Maruyama et al. | 526/249 |
| 5,229,461 A * | 7/1993 | Saitoh et al. | 525/200 |
| 5,292,816 A | 3/1994 | Metz et al. | 525/276 |
| 5,485,541 A | 1/1996 | Bigley, Jr. et al. | |
| 5,496,889 A | 3/1996 | Schlund et al. | 525/166 |
| 5,855,977 A | 1/1999 | Fukushi et al. | 428/36.6 |
| 6,077,609 A | 6/2000 | Blong et al. | 428/412 |
| 6,096,428 A | 8/2000 | Jing et al. | 428/421 |
| 6,138,830 A | 10/2000 | Muggli | 206/532 |
| 6,197,393 B1 | 3/2001 | Jing et al. | 428/35.9 |
| 6,326,436 B2 * | 12/2001 | Bowers | 525/264 |
| 6,342,569 B1 | 1/2002 | Manzoni et al. | 526/249 |
| 6,361,641 B1 | 3/2002 | Blong et al. | 156/243 |
| 6,362,271 B1 | 3/2002 | Lin et al. | 524/520 |
| 6,486,281 B1 | 11/2002 | Kitada et al. | 526/264 |
| 6,703,450 B2 | 3/2004 | Bauerle et al. | 525/326.3 |
| 6,800,694 B2 | 10/2004 | Formaro et al. | |
| 6,867,273 B2 | 3/2005 | Lannuzel et al. | 526/250 |
| 2007/0128393 A1 | 6/2007 | Moulton et al. | 428/36.9 |

FOREIGN PATENT DOCUMENTS

WO   WO 93/06159   4/1993

OTHER PUBLICATIONS

Crivello et al.; "Transition Metal-Catalyzed Tandem Isomerization and Cationic Polymerization of Allyl Ethers. I. Discovery and Scope"; J Polymer Sci A: Polym. Chem; (1997) 35; pp. 1593-1604.
International Search Report for corresponding PCT Application No. PCT/US07/88390 dated Apr. 28, 2008.

* cited by examiner

*Primary Examiner* — Mark Eashoo
*Assistant Examiner* — Nicole M Buie-Hatcher
(74) *Attorney, Agent, or Firm* — Carrie Beatus

(57) ABSTRACT

A polyvinylidene difluoride copolymer with a fluoroolefin selected from 2,3,3,3-tetrafluoropropene, 1,1,3,3,3-pentafluoropropene, 2-chloro-pentafluoropropene, hexafluoropropylene, trifluoroethylene, chlorotrifluoroethylene, 3,3,3-trifluoro-2-trifluoromethylpropene and a mixture thereof, wherein the stoichiometry of the co-monomers defines the barrier properties of the copolymer. Such polymers include moisture barrier copolymers and oxygen barrier copolymer. Processes for preparing such moisture barrier copolymers and oxygen barrier copolymers are also provided.

6 Claims, 2 Drawing Sheets

COPOLYMERS FOR BARRIERS

CROSS-REFERENCE TO A RELATED APPLICATION

The present application claims priority from U.S. Provisional Patent Application No. 60/871,006, filed Dec. 20, 2006, which is incorporated herein by reference.

BACKGROUND OF THE INVENTION

1. Field of the Invention

The present invention generally relates to the use of polyvinylidene difluoride containing copolymers as barrier materials wherein the gas diffusivity of the copolymer can be controlled. More particularly, the present invention relates to compositions where the composition of the copolymers defines the barrier properties.

2. Description of the Prior Art

Fluorine-containing monomers, polymers and copolymers are described in U.S. Pat. Nos. 2,970,988, 2,931,840, 2,996,555, 3,085,996, 6,486,281, 6,867,273 (see Column 3, line 29-50) and U.S. Pat. No. 6,703,450 (see Column 2, line 42, to Column 3, line 5, for monomers). Vinylidene fluoride copolymers are described in U.S. Pat. No. 3,893,987 and a process for making fluoroolefin copolymers is described in U.S. Pat. No. 3,240,757. Vinylidene fluoride/chlorotrifluoroethylene copolymers are described in U.S. Pat. Nos. 5,292,816 and 3,053,818. Vinylidene fluoride/3,3,3-trifluoro-2-trifluoromethylpropene copolymers and a method for making vinylidene fluoride/3,3,3-trifluoro-2-trifluoromethylpropene copolymers are described in U.S. Pat. No. 3,706,723.

Other copolymers made with fluoroolefins are described in U.S. Pat. Nos. 2,599,640; 2,919,263; 3,812,066; 4,943,473; 5,200,480; 6,342,569 and 6,361,641.

Fluorocarbon/Acrylate Coatings are described in U.S. Pat. No. 3,716,599 and powder coating are described in U.S. Pat. No. 5,030,394.

Solvent based blending is described in U.S. Pat. No. 3,324,069. Polyvinylidene fluoride/polymethyl methacrylate blends are described in U.S. Pat. No. 6,362,271. Other blends are described in U.S. Pat. Nos. 5,051,345; 5,496,889 (Compatibilized Blends); U.S. Pat. No. 4,990,406 (F-terpolymer/acrylate blends). Graft Copolymers are described in U.S. Pat. No. 4,308,359.

A wide variety of thermoplastic polymers are known, as are films formed from such thermoplastic polymers. Important physical characteristics of such films include their barrier properties, including barriers to gas, aroma, and/or vapor such as water vapor, as well as its physical characteristics, such as toughness, wear and weathering resistances, and light transmittance. These properties are especially important in film applications such as, for example, in the use of films as a packaging material for food or medical products.

It is well known in the art to produce multilayer fluoropolymers films. See, for example, U.S. Pat. Nos. 4,146,521; 4,659,625; 4,677,017; 5,139,878; 5,855,977; 6,096,428; 6,138,830; and 6,197,393. Many fluoropolymers materials are commonly known for their excellent moisture and vapor barrier properties, and therefore are desirable components of packaging films. In addition, fluoropolymers exhibit high thermal stability and excellent toughness.

Polychlorotrifluoroethylene has been employed as a high performance moisture barrier polymer. Comonomers, such as vinylidene fluoride, have been introduced to modify water permeation rate or other physical properties (WO 9306159 and U.S. Published Application No. 2007128393). Various fluorocopolymers, including copolymers of 2,3,3,3-tetrafluoro-1-propene and chlorotrifluoroethylene, were disclosed in U.S. Pat. No. 2,970,988 as useful in protective coatings and as elastomers.

There is a continuing need in the art for further improvements in fluoropolymers films and film structures, particularly those which provide a film structure featuring differentiated barrier performance for different gases and/or water vapor. This invention provides compositions showing specific controlled gas diffusivity for oxygen and for water vapor as defined by copolymer stoichiometry.

For this reason, the copolymer compositions and the processes for making these compositions according to the present invention are potentially useful commercially.

SUMMARY OF THE INVENTION

The present invention provides an oxygen barrier copolymer. The oxygen barrier copolymer includes:

from about 50 wt % to about 99.9 wt % vinylidene fluoride; and from about 0.1 wt % to about 50 wt % a fluorinated comonomer;

wherein said copolymer is substantially impermeable to oxygen.

The present invention also provides a moisture or water vapor barrier copolymer. The moisture barrier copolymer includes:

from about 0.1 wt % to about 50 wt % vinylidene fluoride; and from about 50 wt % to about 99.9 wt % a fluorinated comonomer;

wherein said copolymer is substantially impermeable to moisture.

The present invention further provides a process for the preparation of an oxygen barrier copolymer. The process includes the step of contacting in a reaction zone:

vinylidene fluoride;

a fluorinated comonomer;

an initiator; and optionally a non-fluorinated comonomer;

wherein said contacting is carried out at a temperature, pressure and length of time sufficient to produce an oxygen barrier copolymer having a composition including from about 50 wt % to about 99.9 wt % vinylidene fluoride and from about 0.1 wt % to about 50 wt % a fluorinated comonomer.

The present invention further provides a process for the preparation of a moisture barrier copolymer. The process includes the step of contacting in a reaction zone:

vinylidene fluoride;

a fluorinated comonomer;

an initiator; and optionally a non-fluorinated comonomer;

wherein said contacting is carried out at a temperature, pressure and length of time sufficient to produce a moisture barrier copolymer having a composition including from about 0.1 wt % to about 50 wt % vinylidene fluoride; and from about 50 wt % to about 99.9 wt % a fluorinated comonomer.

There is also provided another embodiment of a moisture and/or gas barrier copolymer. The copolymer has from about 90 wt % to about 99.9 wt % chlorotrifluoroethylene and from about 10 wt % to about 0.1 wt % of a fluoromonomer. The copolymer can be selected from the group consisting of 2,3,3,3-tetrafluoro-1-propene, $CF_3CF=CF_2$, $CF_3CH=CF_2$, CF₃CF=CFH, cis-CF₃CH=CFH, trans-CF₃CH=CFH, CF₃CH=CH₂, and combinations thereof based on the total weight of the copolymer.

DETAILED DESCRIPTION OF THE PREFERRED EMBODIMENTS

Figure 1:
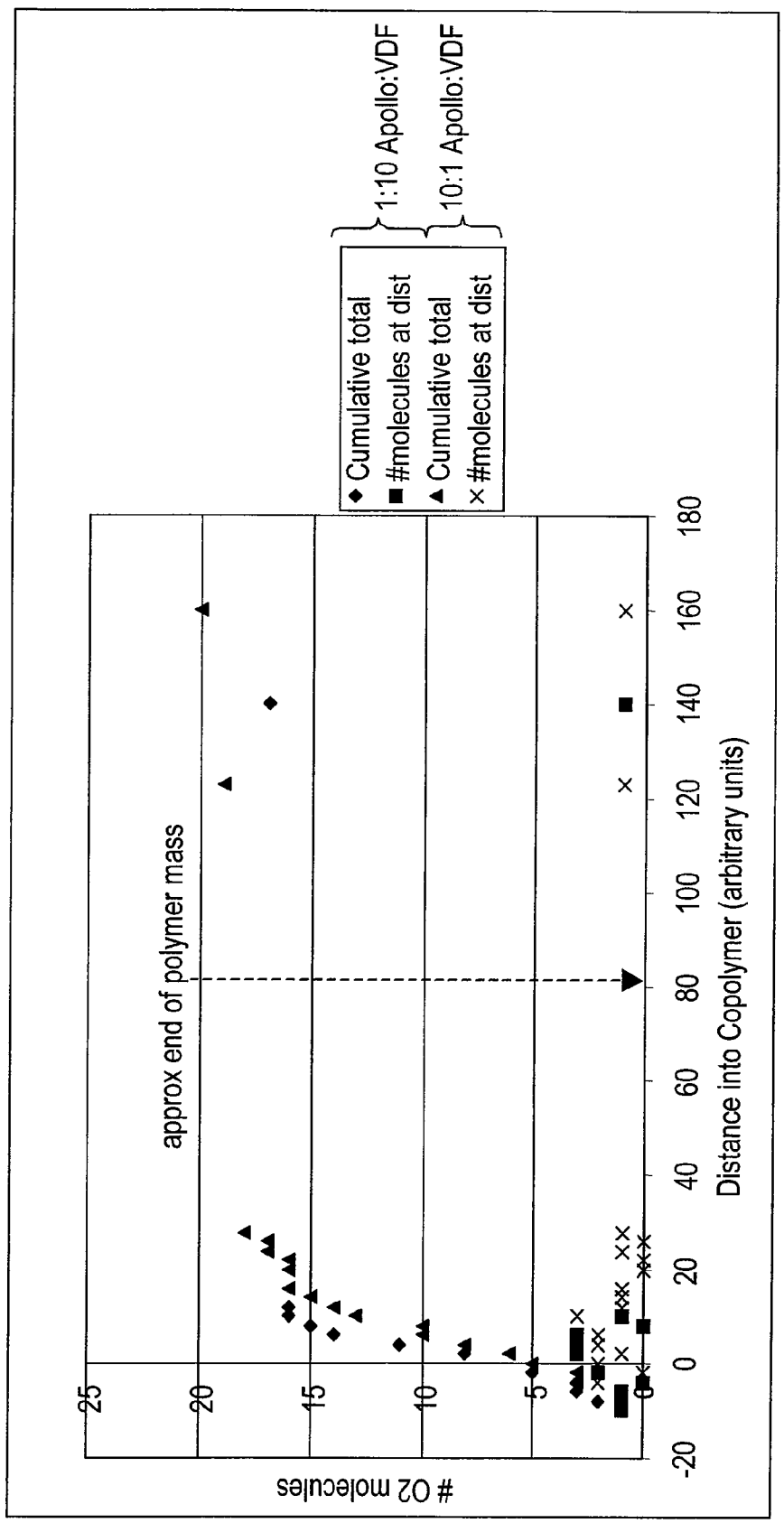
FIG. 1 is a chart showing a comparison of oxygen diffusion into two copolymers; one a 10:1 vinylidene fluoride:2,3,3,3-tetrafluoropropene random copolymer composition and the other a 1:10 vinylidene fluoride:2,3,3,3-tetrafluoropropene random copolymer composition.

The present invention relates to fluoroolefin copolymers with specific barrier properties and the process for making them.

The oxygen barrier copolymer present invention includes from about 50 wt % to about 99.9 wt % vinylidene fluoride and from about 0.1 wt % to about 50 wt % a fluorinated comonomer.

In contrast, the moisture or water vapor barrier copolymer includes from about 0.1 wt % to about 50 wt % vinylidene fluoride and from about 50 wt % to about 99.9 wt % a fluorinated comonomer.

Fluorinated comonomer selected from 2,3,3,3-tetrafluoropropene, 1,1,3,3,3-pentafluoropropene, 2-chloro-pentafluoropropene, hexafluoropropylene, trifluoroethylene, chlorotrifluoroethylene, 3,3,3-trifluoro-2-trifluoromethylpropene, and a mixture thereof, are preferred.

However, other fluorinated comonomers and non-fluorinated comonomers may also be used in modest amounts.

Such fluorinated comonomers include a fluoroolefin comonomer represented by the formula:

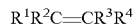

wherein each of $R^1$, $R^2$, $R^3$, and $R^4$ is independently selected from hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that at least one of the $R^1$, $R^2$, $R^3$, and $R^4$ groups is either fluorine or a fluorine-containing group, and a mixture thereof. Examples of the fluoroolefin comonomer include CFH=CH₂, CF₂=CH₂, CF₂=CFH, CF₂=CF₂, CClF=CF₂, CBrF=CF₂, CF₃CH=CHF, CF₃CF=CF₂, CF₃CH=CF₂, cis-CF₃CF=CHF, trans-CF₃CF=CHF, CF₃CH=CH₂, CF₃CF=CH₂, CF₃CF₂CF=CF₂, CF₃CF₂CH=CF₂, CF₃CF₂CF=CHF, CF₃CF₂CH=CH₂, CF₃CF₂CF=CH₂, CF₃CF₂CF₂CF=CF₂, CF₃CF₂CF₂CH=CF₂, CF₃CF₂CF₂CF=CHF, CF₃CF₂CF₂CH=CH₂, CF₃CF₂CF₂CF=CH₂, CF₃CH=CHCF₃, CF₃CH=CFCF₃, CF₃CF=CFCF₃, HOCH₂CH=CHF, HOCH₂CH=CF₂, HOCH₂CF=CH₂, HOCH₂CF=CHF, HOCH₂CF=CF₂, HOCH₂CF=CH₂, CF₃CH=CHCl, CF₃CCl=CH₂, CF₃CCl=CHF, CF₃CCl=CF₂, CF₃CF=CHCl, CF₃CH=CFCl, (CF₃)₂C=CH₂, CF₃CF₂CF₂CH=CH₂, CF₃CF₂CF₂OCF=CF₂, CF₃CF₂CF₂CF₂CH=CH₂, and mixtures thereof.

Additional examples of fluorinated comonomers include α-trifluoromethylacrylate, α-trifluoromethylacrylate, α-trifluoromethylacrylate, vinyl ether of 4 to 24 carbon atoms substituted by at least one fluorine atoms, vinyl carboxylate of 5-24 carbon atoms wherein the carboxylate is substituted by at least one fluorine, and perfluoroalkyl vinyl ether.

Examples of such non-fluorinated comonomers include alkene of 2-8 carbon atoms, acrylate or methacrylate ester of 4 to 24 carbon atoms, hydroxyethyl acrylate or methacrylate, hydroxypropyl acrylate or methacrylate, glycidyl acrylate or methacrylate, acrylonitrile, methacrylonitrile, vinyl ether of 4 to 24 carbon atoms optionally substituted by at least one hydroxy group, styrene, alpha-methylstyrene, paramethyl styrene, allyl alcohol, methallyl alcohol, vinyl acetate, vinyl carboxylate of 5-24 carbon atoms wherein the carboxylate is optionally substituted by at least one hydroxy group, methyl ethyl ketone, hydroxyethyl vinyl ether, hydroxybutyl vinyl ether, alkyl vinyl ether, and combinations thereof, Specific examples of the non-fluorinated comonomers include alkene of 2-8 carbon atoms, acrylate or methacrylate ester of 4 to 24 carbon atoms, acrylonitrile, methacrylonitrile, vinyl ether, styrene, alpha-methylstyrene, paramethyl styrene, allyl alcohol, methallyl alcohol, vinyl acetate, vinyl carboxylate of 5-24 carbon atoms, methyl ethyl ketone, hydroxyethyl vinyl ether, hydroxybutyl vinyl ether, alkyl vinyl ether, and a mixture thereof and examples of the acrylic non-fluorinated comonomers include methyl acrylate, ethyl acrylate, propyl acrylate, butyl acrylate, ethylhexylacrylate, octyl acrylate, dodecyl acrylate, stearyl acrylate, benzyl acrylate, phenyl acrylate, methylmethacrylate, ethylmethacrylate, butylmethacrylate, ethylhexylmethacrylate, and combinations thereof.

To achieve an oxygen barrier copolymer including monomers vinylidene fluoride and a second fluorinated olefin, the weight percentage of vinylidene fluoride is at least 50% and no more than 99.9% and the weight percentage of the second fluoroolefin is at least 0.1% and no more than 50%. Said compositions differentiate between diffusivities of oxygen and, for example, water vapor providing superior barrier properties toward oxygen as compared with barrier properties toward water vapor.

To achieve a moisture barrier copolymer including monomers vinylidene fluoride and a second fluorinated olefin, the weight percentage of vinylidene fluoride is at least 0.1% and no more than 50% and the weight percentage of the second fluoroolefin is at least 50% and no more than 99.9%. Said compositions differentiate between diffusivities of water vapor and, for example, oxygen providing superior barrier properties toward water vapor as compared with barrier properties toward oxygen.

It has been found that the diffusion properties of vinylidene fluoride/fluoroolefin copolymers are different for oxygen and moisture depending on the copolymer composition. Thus the vinylidene fluoride/fluoroolefin copolymer can act as a differential barrier between oxygen and moisture. Materials including films may be manufactured showing specific barrier properties. Films with different stoichiometries may be bonded together for combined effects.

When a random copolymer of vinylidene fluoride/2,3,3,3-tetrafluoropropene with a high proportion of vinylidene fluoride, the material has a low barrier to water but a higher barrier to oxygen. When the monomer proportions are reversed the diffusivity trends are reversed. This means that gas diffusivity can be controlled through the stoichiometric composition of the vinylidene fluoride/fluoroolefin copolymer.

Without being limited by theory, the diffusivity differences appear to be related to interaction differences of the gases with the polymer composition.

As can be seen in FIG. 1, the invention provides vinylidene fluoride/fluoroolefin copolymer compositions wherein the higher the vinylidene fluoride content in the copolymer composition the higher the barrier to oxygen diffusion. Thus polyvinylidene fluoride has excellent barrier properties toward oxygen and these properties are maintained in the copolymer composition of 10:1 vinylidene fluoride:2,3,3,3-tetrafluoropropene.

Figure 2:
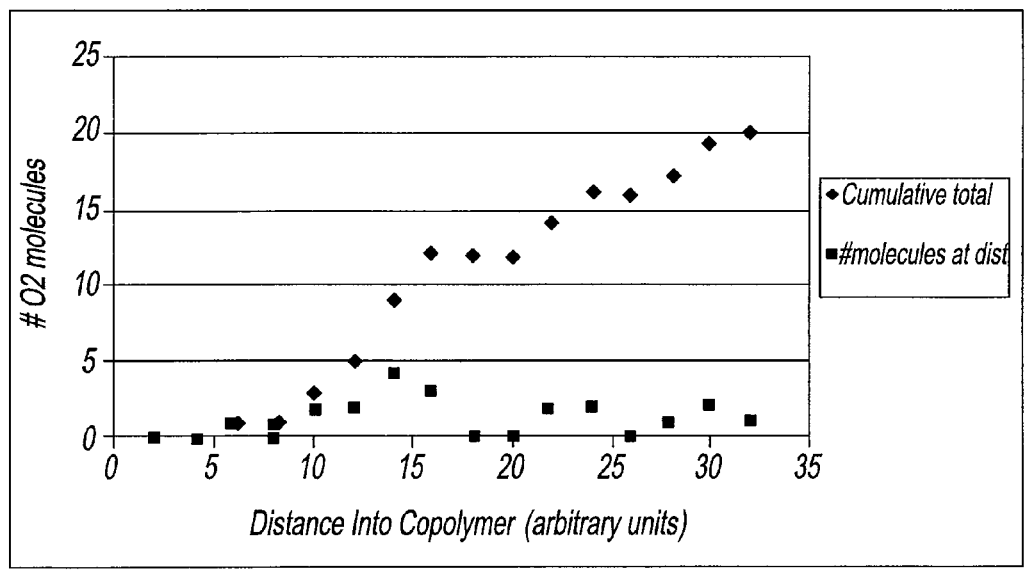
FIG. 2 is a chart showing water diffusion into a copolymer of 10:1 vinylidene fluoride:2,3,3,3-tetrafluoropropene random copolymer composition.

As can be seen in FIG. 2, the invention provides vinylidene fluoride/fluoroolefin copolymer compositions wherein the higher the vinylidene fluoride content in the copolymer composition the lower the barrier to moisture diffusion. Thus high vinylidene fluoride content vinylidene fluoride: 2,3,3,3-tetrafluoropropene copolymers surprisingly demonstrate barrier properties toward moisture that show a measurable and reverse interaction difference as compared with barrier properties shown toward oxygen diffusion.

Fluorine-containing polymers and copolymers are described in U.S. Pat. Nos. 2,970,988 and 6,077,609. Vinylidene fluoride copolymers are described in U.S. Pat. No. 3,893,987 and a process for making fluoroolefin copolymers is described in U.S. Pat. No. 3,240,757. Vinylidene difluoride/chlorotrifluoroethylene copolymers are described in U.S. Pat. Nos. 5,292,816 and 3,053,818. Vinylidene fluoride/3,3,3-trifluoro-2-trifluoromethylpropene copolymers and a method for making vinylidene fluoride/3,3,3-trifluoro-2-trifluoromethylpropene copolymers are described in U.S. Pat. No. 3,706,723.

The fluoroolefin comonomer of the vinylidene fluoride/fluoroolefin copolymer can be any fluoroolefin of suitable reactivity that gives a copolymer with specific barrier properties. In one preferred embodiment of the invention the second fluoroolefin comonomer is selected from 2,3,3,3-tetrafluoropropene, 1,1,3,3,3-pentafluorpropene and 2-chloropentafluoropropene. In a more preferred embodiment of the invention the second fluoroolefin comonomer is 2,3,3,3-tetrafluoropropene. In yet another more preferred embodiment of the invention the second fluoroolefin comonomer is 1,1,3,3,3-pentafluoropropene.

In another preferred embodiment of the invention the second fluoroolefin comonomer is selected from hexafluoropropene, trifluoroethylene, chlorotrifluoroethylene and 3,3,3-trifluoro-2-trifluoromethylpropene.

The oxygen barrier vinylidene fluoride/fluoroolefin copolymer of the invention includes the weight percentage of the vinylidene fluoride comonomer between 50 and 99.9% and the weight percentage of the second fluoroolefin comonomer between 0.1 and 50%. In a preferred embodiment of the invention the weight percentage of the vinylidene fluoride comonomer in the copolymer is between 70 and 95% and the weight percentage of the second fluoroolefin commoner in the copolymer is between 5 and 30%. In a further preferred embodiment of the invention, the weight percentage of the vinylidene fluoride comonomer in the copolymer is between 85 and 95% and the weight percentage of the second fluoroolefin comonomer in the copolymer is between 5 and 15%.

The moisture barrier vinylidene fluoride/fluoroolefin copolymer of the invention includes the weight percentage of the vinylidene fluoride comonomer between 0.1 and 50% and the weight percentage of the second fluoroolefin comonomer between 50 and 99.9%. In a preferred embodiment of the invention the weight percentage of the vinylidene fluoride comonomer in the copolymer is between 5 and 30% and the weight percentage of the second fluoroolefin commoner in the copolymer is between 70 and 95%. In a further preferred embodiment of the invention, the weight percentage of the vinylidene fluoride comonomer in the copolymer is between 5 and 15% and the weight percentage of the second fluoroolefin commoner in the copolymer is between 85 and 95%.

The invention still further provides a process for forming the controlled barrier vinylidene fluoride/fluoroolefin copolymers of the invention including the step of contacting in a reaction zone 1,1,-difluoroethylene; a fluorinated comonomer; an initiator; and optionally a non-fluorinated comonomer; in a ratio such that the desired copolymer composition designed for a specific use is achieved.

Preferably, the contacting is carried out at a temperature, pressure and length of time sufficient to produce said fluoroolefin copolymer.

The invention still further provides said process wherein said reaction zone preferably includes a solvent selective from water, ethyl acetate, butyl acetate, toluene, xylene, methyl ethyl ketone, 2-heptanone, 1-methoxy-2-propanol acetate, 1,1,1,-trichloroethane and mixtures thereof. A preferred solvent in the reaction zone is water.

Another aspect of the process of the invention is use of selected free-radical initiators. Common initiators used for free radical polymerization of unsaturated monomers are generally satisfactory in the process of the invention depending on the nature and properties desired. For example, azo-type initiators result in high polydispersity in the molecular weight distribution whereas perester type peroxides produce a narrow molecular weight distribution and, as such, are preferably used in most cases.

Examples of the initiator include azobiscyanoacrylates, aliphatic peresters, such as, t-butyl peroctoate and t-amyl peroctoate, aliphatic peroxides, such as, tert-butyl peroxide, aliphatic hydroperoxides, such as, tert-butyl hydroperoxide, inorganic peroxides such as sodium peroxide, inorganic persulfates such as potassium persulfate, redox initiators involving persulfates as oxidant and sulfites such as sodium metabisulfite as reductant, percarbonates such as t-butylperoxide-2-ethylhexylcarbonate, peroxydicarbonates, perhaloacetyl peroxides and a mixture thereof.

Generally, the perester initiator is used at a concentration of less than 20 weight percent based on the weight of the total monomers, usually the perester initiator is used at concentrations less than 12 weight percent, with a range of from 0.1 to 1.0 weight percent being preferred.

Preferably, the perester initiator is added to the reaction zone together with the monomeric reactants, i.e., the azeotropic mixture of monomers, as previously stated. However, a minor amount of peroxide as a finishing step may be added after the polymerization reaction has substantially ended. Such a finishing step has the purpose of removing minor amounts of unreacted monomers and aids in achieving a reaction zone product that may be used directly for the desired end use or application.

Thus, it is important that at least 50, and preferably at least 80, weight percent of the peroxide to be added with the monomers and the balance of the initiator added during the polymerization reaction.

The polymerization process may be conducted in the presence of tertiary amine or a tertiary mercaptan-type chain transfer agent. The use a chain transfer agent may result in a copolymer of suitable molecular weight to have the required organic solvent solubility.

Generally, the chain transfer agent is used at a concentration of less than 5 weight percent based on the weight of monomers added to the reaction zone.

The process can be carried out as a continuous, batch, vapor phase, fixed bed, solution, emulsion, or a suspension type of a polymerization process.

The reaction zone can further include a diluent, such as, a solvent or mixture of solvents. Solvents used in non-aqueous polymerization methods are preferably, non-polar, non-reactive, non-polymerizable, non-protic solvents are used as the reaction medium. However, other solvents, such as, non-interfering non-polymerizable liquid which is a solvent both for the monomers and copolymer products of the invention. Suitable reaction solvents include esters, ketones, ethers, aromatic hydrocarbons, chlorinated hydrocarbons, aliphatic hydrocarbons, and mixtures thereof. Illustrative solvents are ethyl acetate, butylacetate, toluene, xylene, methyl ethyl ketone, 2-heptanone, and 1,1,1-tri-chloroethane. Mixtures thereof can also be employed. The aqueous polymerization reaction is preferably conducted using water soluble initiators, buffers such as inorganic phosphates or carbonates to maintain required pH level, required emulsifiers such as salts of perfluoroalkyl carbonates or sulfonates.

In operation, preferably at least 10 wt % of the reactants are converted to the product. More preferably, up to at least 80 wt % of the reactants are converted to the product, and most preferably, at least 90 wt % of the reactants are converted to the product.

Operation of the process of the present invention under high conversion conditions is generally preferred, particularly under batch or solution, emulsion or suspension conditions. However, for continuous, vapor phase, or fixed bed reactions, the present process provides the unique advantage of recycling of the unreacted starting materials thereby providing a cost advantage over other known processes of the prior art.

Polymerization can be carried out essentially the same way as the methods known and described in the art, such as, the methods described in *J. Polymer Sci. A: Polym. Chem.* (1997) 35, 1593-1604, and in U.S. Pat. Nos. 2,970,988; 3,893,987 (see Example 2); U.S. Pat. No. 3,240,757; 5,292,816; 3,053,818 (see Example 6); U.S. Pat. No. 3,812,066; 2,599,640; 6,342,569; 5,200,480; and 2,919,263.

The reaction zone preferably has provision for agitation and heat exchange to assist uniformity and process control.

The process can be carried out as a continuous, batch, vapor phase, fixed bed, solution, emulsion, or a suspension type of a polymerization process.

The reaction zone can further include a diluent, such as, a solvent or mixture of solvents. Suitable reaction solvents include water or non-polymerizable organic solvents including perfluorinated and perchlorinated alkanes that are liquids at 20° C. Other suitable reaction solvents include esters, ketones, ethers, aromatic hydrocarbons, chlorinated hydrocarbons, aliphatic hydrocarbons, and mixtures thereof. Illustrative solvents are 1,1,1-trichloroethane, ethyl acetate, butyl acetate, toluene, xylene, methyl ethyl ketone, and 2-heptanone. Mixtures thereof can also be employed.

There is another embodiment of a moisture barrier copolymer in the present invention. The copolymer affords a high degree of resistance to moisture and gas permeation while exhibiting desirable thermal properties. The copolymer has from about 90 wt % to about 99.9 wt % CTFE (chlorotrifluoroethylene) monomer and from about 10 wt % to about 0.1 wt % of a fluoromonomer. The fluoromonomer is preferably selected from the group consisting of 2,3,3,3-tetrafluoro-1-propene, $CF_3CF=CF_2$, $CF_3CH=CF_2$, $CF_3CF=CFH$, cis-$CF_3CH=CFH$, trans-$CF_3CH=CFH$, $CF_3CH=CH_2$, and combinations thereof based on the total weight of the copolymer. A copolymer of CTFE and 1234yf (2,3,3,3-tetrafluoro-1-propene) is preferred. The copolymer preferably has chlorotrifluoroethylene from about 93 wt % to about 99.9 wt % and the fluoromonomer from about 7 wt % to about 0.1 wt %. The copolymer preferably has chlorotrifluoroethylene from about 96 wt % to about 99.9 wt % and the fluoromonomer from about 4 wt % to about 0.1 wt %. The copolymer exhibits a moisture permeability is about 0.25 gm-mil/(100 in$^2$-day) or less, preferably about 0.2 gm-mil/(100 in$^2$-day) or less. A permeability range of about 0.1 gm-mil/(100 in$^2$-day) to about 0.25 gm-mil/(100 in$^2$-day) or less. The copolymer may also have comonomers of other fluorinated monomers and/or non-fluorinated comonomers therein, such as those described above.

Films may be manufactured using the barrier copolymers according to the present invention which show specific barrier properties. In addition, a plurality of films of these copolymers having different compositions may be bonded together for producing multi-layered films that have the combined effects of the barrier properties of the individual films.

The following non-limiting examples are illustrative of the various embodiments of the present invention. It is within the ability of a person of ordinary skill in the art to select other variable from amongst the many known in the art without departing from the scope of the present invention. Accordingly, these examples shall serve to further illustrate the present invention, not to limit them.

EXAMPLES

Example 1

Emulsion Copolymerization of 1234yf and VDF

A typical polymerization is run in a stirred stainless steel autoclave in which reactants are added by methods known in the art. To a 30 mL autoclave is added $(NH_4)_2S_2O_8$-ammonium persulfate: 0.14 g dissolved in 1.0 mL of de-$O_2$/DI water $Na_2S_2O_5$-sodium metasulfite: 0.3 g dissolved in 1.0 mL of de-$O_2$/DI water. $FeSO_4$-ferrous sulfate: 0.005 g dissolved buffer solution. $Na_2HPO_4/NaH_2PO_4$ buffer: 1.34/0.68 g dissolved in 180 mL. $C_7F_{15}CO_2(NH_4)$ surfactant: 2.44 g dissolved with buffer. Add 18 mL of the emulsion solution (water/$Na_2HPO_4/NaH_2PO_4/FeSO_4/C_7F_{15}CO_2(NH_4)$).

During the polymerization, a mixture of the solution is stirred while 9.5 g of a mixture of 10 mol % 1234yf and 90 mol % of VDF are added in which an autogenous pressure is obtained at 10° C. The pressure is kept during the polymerization to obtain a constant concentration of monomer. After 48 hours, the polymerization is stopped and monomers are released from the autoclave. The polymerization latex was coagulated in 25% HCl and polymer was washed and dried. 2.3 grams of a white copolymer was obtained.

Figure 3:
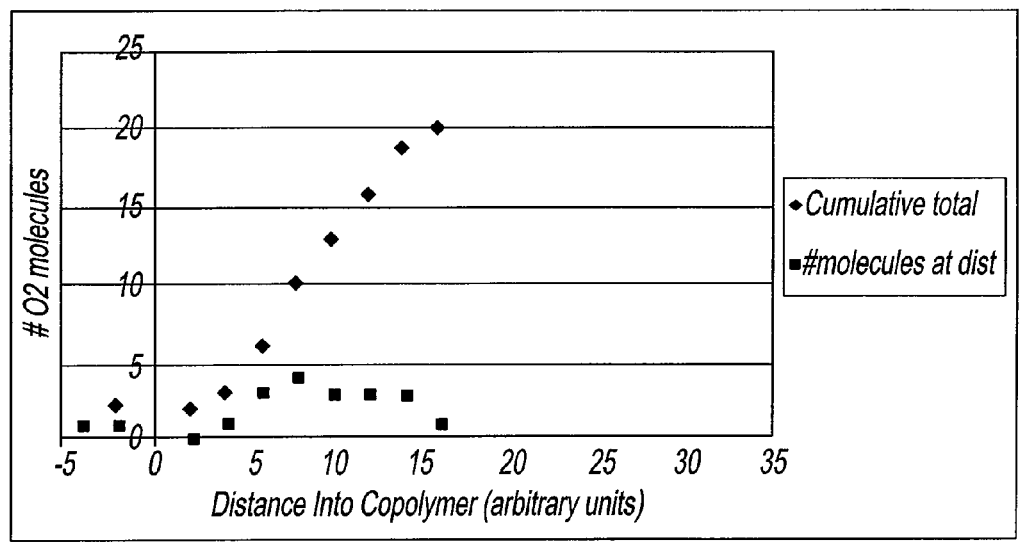
FIG. 3 is a chart showing water diffusion into a copolymer of a 1:10 vinylidene fluoride:2,3,3,3-tetrafluoropropene random copolymer composition.

The copolymer of this example was tested for $O_2$ diffusion. The results are shown in FIG. 1. The copolymer was also tested for water permeation. The results are shown in FIG. 3. The general penetration trends for water were opposite that of $O_2$ and the 1234yf helped to block water.

An analogous copolymer having 90 mol % 1234yf and 10 mol % of VDF was prepared in like manner as the above copolymer. The analogous copolymer was tested for $O_2$ diffusion. The results are shown in FIG. 1. The analogous copolymer was also tested for water permeation. The results are shown in FIG. 2.

Example 2

Emulsion Type Terpolymerization of VDF/CH2=CFCF3/CF2=CFCl

A typical polymerization is run in a stirred stainless steel autoclave in which reactants are added by methods known in the art. To a 300 mL autoclave is added $(NH_4)_2S_2O_8$-ammonium persulfate: 22 mL of a solution of 1.12 g dissolved in 40 mL of de-$O_2$/DI water. $Na_2S_2O_5$-sodium metasulfite: 12.5 mL of a solution of 2.4 g dissolved in 40 mL of de-$O_2$/DI water. $FeSO_4$-ferrous sulfate: 0.005 g dissolved buffer solution. $Na_2HPO_4/NaH_2PO_4$ buffer: 1.34/0.68 g dissolved 180 mL. $C_7F_{15}CO_2(NH_4)$ surfactant: 2.44 g dissolved with buffer. Add 180 mL of the emulsion solution (water/$Na_2HPO_4$/$NaH_2PO_4$/$FeSO_4$/$C_7F_{15}CO_2(NH_4)$)).

During the polymerization, a mixture of the solution is stirred while 62.4 g of a mixture of 10.1 mol % 1234yf and 88.1 mol % of CTFE and 1.8 mol % VDF are added and an autogenous pressure is obtained at 10° C. The pressure is kept during the polymerization to obtain a constant concentration of monomer. After 6 hours, the polymerization is stopped and monomers are released from the autoclave. The polymerization latex was coagulated in 25% HCl and polymer was washed and dried. 26 grams of a white terpolymer was obtained.

Example 3

Chlorotrifluoroethylene/1234yf Copolymer and Moisture Permeation Comparison with Other Chlorotrifluoroethylene Polymers CTFE/1234yf copolymer Emulsion Polymerization The deionized water was purged with nitrogen and the 300 ml reactor was evacuated. The polymerization initiator solutions were prepared by weighing out solids individually and completely dissolving the solids separately in water just prior to use: $(NH_4)_2S_2O_8$-ammonium persulfate: 0.3 g dissolved in 10 ml of deoxygenated de-ionized water, $Na_2S_2O_5$-sodium metasulfite: 4.5 g dissolved in 40 ml of deoxygenated de-ionized water, $FeSO_4$-ferrous sulfate: 0.005 g dissolved in the buffer solution, $Na_2HPO_4/NaH_2PO_4$ buffer: 1.34/0.68 g respectively is dissolved in 180 ml deoxygenated de-ionized water. $C_7F_{15}CO_2(NH_4)$ surfactant: 2.44 g dissolved with buffer. Keep the reaction mixture temperature at about 10° C. Add 180 ml of the emulsion solution (water/$Na_2HPO_4$/$NaH_2PO_4$/$FeSO_4$/$C_7F_{15}CO_2(NH_4)$) and pump into the autoclave via syringe. Add the $(NH_4)_2S_2O_8$ and $Na_2S_2O_5$ solution to the autoclave via syringe for initial charge (and then by metering pump for future charges) and stir mixture. Fill an ISCO syringe pump with CTFE/1234yf at a 95:5 mole percent ratio, 52.25 grams and 2.75 grams respectively. Start adding the CTFE/1234yf solution rapidly to a system pressure of about 70 psig and continue at constant flow of 100 ml/min until all the CTFE/1234yf has been added. Let the reaction continue and make adjustments as necessary. Let the reaction proceed to the desired level of completion by monitoring system pressure.

CTFE-1234yf Copolymer Suspension Polymerization

A copolymer having 3 wt % 1234yf (2,3,3,3-tetrafluoropropene) and 97 wt % CTFE (chlorotetrafluoroethylene) was prepared as follows. Deionized water was purged with nitrogen and the system evacuated. The polymerization initiator solutions were prepared by weighing out solids individually and completely dissolving the solids separately in water just prior to use: $(NH_4)_2S_2O_8$-ammonium persulfate: 2.5 g dissolved in 40 ml of deoxygenated de-ionized water, $Na_2S_2O_5$-sodium metasulfite: 4.5 g dissolved in 40 ml of deoxygenated de-ionized water, $CuCl_2$-cupric chloride: 0.01 g dissolved in the buffer solution, $Na_2HPO_4/NaH_2PO_4$ buffer: 3/1.5 g respectively is dissolved in 400 ml of deoxygenated de-ionized water. Add 200 ml of the water/$Na_2HPO_4$/$NaH_2PO_4$/CuCl solution and pump into the 500 ml autoclave via metering pump or syringe. Add 15 mL $Na_2S_2O_5$ solution to the autoclave via metering pump and stir mixture. Keep the reaction mixture temperature at 20-21° C. Add 15 ml of the $(NH_4)_2S_2O_8$ solution to the autoclave via metering pump and stir mixture slowly during the addition of monomer. Fill an ISCO syringe pump with CTFE/1234yf at a 95:5 mole percent ratio at −35° C. Monomer is typical added at about 15% by weight of the water used in the system. Start adding the 30 grams of CTFE/1234yf solution rapidly to a system pressure of pressure to 100 psig and continue at constant flow of 100 ml/min until all the CTFE/1234yf has been added. The polymerization is started as a batch reaction by slowly metering in the $Na_2S_2O_5$ solution at 0.01 ml/min. Let the reaction continue and make adjustments as necessary. Let the reaction proceed to the desired level of completion by monitoring system pressure. About 80% solid polymer forms in about 8 hours.

There are several weak infrared spectral peaks at 1450, 1421, 1380, 1346 and 1070 $cm^{-1}$, which are indicative of TFP incorporation into the polymer. Two peaks appear useful for quantitation −1346 and 1070 $cm^{-1}$. Due to the low level of hydrogen in the polymer, hydrogen elemental analysis is of marginal use. However, carbon and fluorine elemental analysis is satisfactory.

The CTFE/1234yf copolymer was formed into a film of 1.00 mil thickness by using a film gauge and a heated carver press.

The CTFE/1234yf copolymer was tested for moisture permeation against a CTFE homopolymer and two CTFE/vinylidene difluoride (VF) copolymers (3 wt % and 5 wt % vinylidene fluoride). The films of the CTFE homopolymer and two CTFE/vinylidene difluoride (VF) copolymers were prepared in substantially the same manner as for the CTFE/1234yf copolymer. Films were typically of 50 $cm^2$ area and 1.00 mil thick. A MOCON Water vapor permeation system was used for the measurements.

The results showed that the film of the CTFE/1234yf copolymer exhibited much better moisture barrier performance, i.e., lower moisture permeation, than the films of the CTFE/VF copolymers. A small amount of 1234yf maintains a high degree of barrier protection while modifying and delivering desirable thermal properties compared to the homopolymer. The results are set forth in the Table below.

TABLE

| | Water Permeation | Heat | | Cool | | | Reheat | | |
|---|---|---|---|---|---|---|---|---|---|
| | gm-mil/[100 $in^2$-day] | $T_m$(° C.) | $H_f$(J/g) | $T_g$(° C.) | $T_{cc}$(° C.) | $H_c$(J/g) | $T_g$(° C.) | $T_m$(° C.) | $H_f$(J/g) |
| Aclar Ultrex 2000 Homopolymer | 0.0154 | 211.34 | −13.98 | | 182.06 | 16.99 | | 214.53 | −17.15 |

TABLE-continued

| | Water Permeation | Heat | | Cool | | | Reheat | | |
|---|---|---|---|---|---|---|---|---|---|
| | gm-mil/[100 in²-day] | $T_m(°C.)$ | $H_f(J/g)$ | $T_g(°C.)$ | $T_{cc}(°C.)$ | $H_c(J/g)$ | $T_g(°C.)$ | $T_m(°C.)$ | $H_f(J/g)$ |
| Aclar VK 22A 2.5% VF2 | 0.03 | 205.91 | −11.55 | | 172.07 | 12.4 | 51.4[1] | 208.04 | −12.91 |
| Aclar VX 5.0% VF2 | 0.033 | 165.18 | −6.78 | 46 | 126.88 | 6.62 | 52 | 174 | −8.22 |
| NEW CTFE/1234yf 3.0% 1234yf | 0.019 | 190 | −4.76 | 43.7 | 140.23 | 4.89 | 48.8 | 191.87 | −4.53 |

ACLAR © is a Honeywell International brand of Polychlorotrifluoroethylene. ACLAR Ultrex a pure homopolymer film. ACLAR VK22A is a 2.5 wt % copolymer with vinylidene fluoride.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. An oxygen barrier copolymer comprising:
   from about 50 wt % to about 99.9 wt % of vinylidene fluoride; and
   from about 0.1 wt % to about 50 wt % of 2,3,3,3-tetrafluoropropene; and
   a non-fluorinated comonomer;
   wherein said copolymer is substantially impermeable to oxygen.

2. The oxygen barrier copolymer of claim 1, wherein the ratio of vinylidene fluoride to 2,3,3,3-tetrafluoropropene is 10:1.

3. The oxygen barrier copolymer of claim 1, wherein said vinylidene fluoride is from about 70 wt % to about 95 wt % of the copolymer.

4. The oxygen barrier copolymer of claim 1, wherein said 2,3,3,3-tetrafluoropropene is from about 5 wt % to about 30 wt % of the copolymer.

5. The oxygen barrier copolymer of claim 1, wherein said vinylidene fluoride is from about 85 wt % to about 95 wt % of the copolymer.

6. The oxygen barrier copolymer of claim 1, wherein said 2,3,3,3-tetrafluoropropene is from about 5 wt % to about 15 wt % of the copolymer.

* * * * *